Nov. 26, 1935.　　E. A. THOMPSON　　2,022,096
SYNCHRONIZED POWER TRANSMISSION MECHANISM
Original Filed Aug. 27, 1928
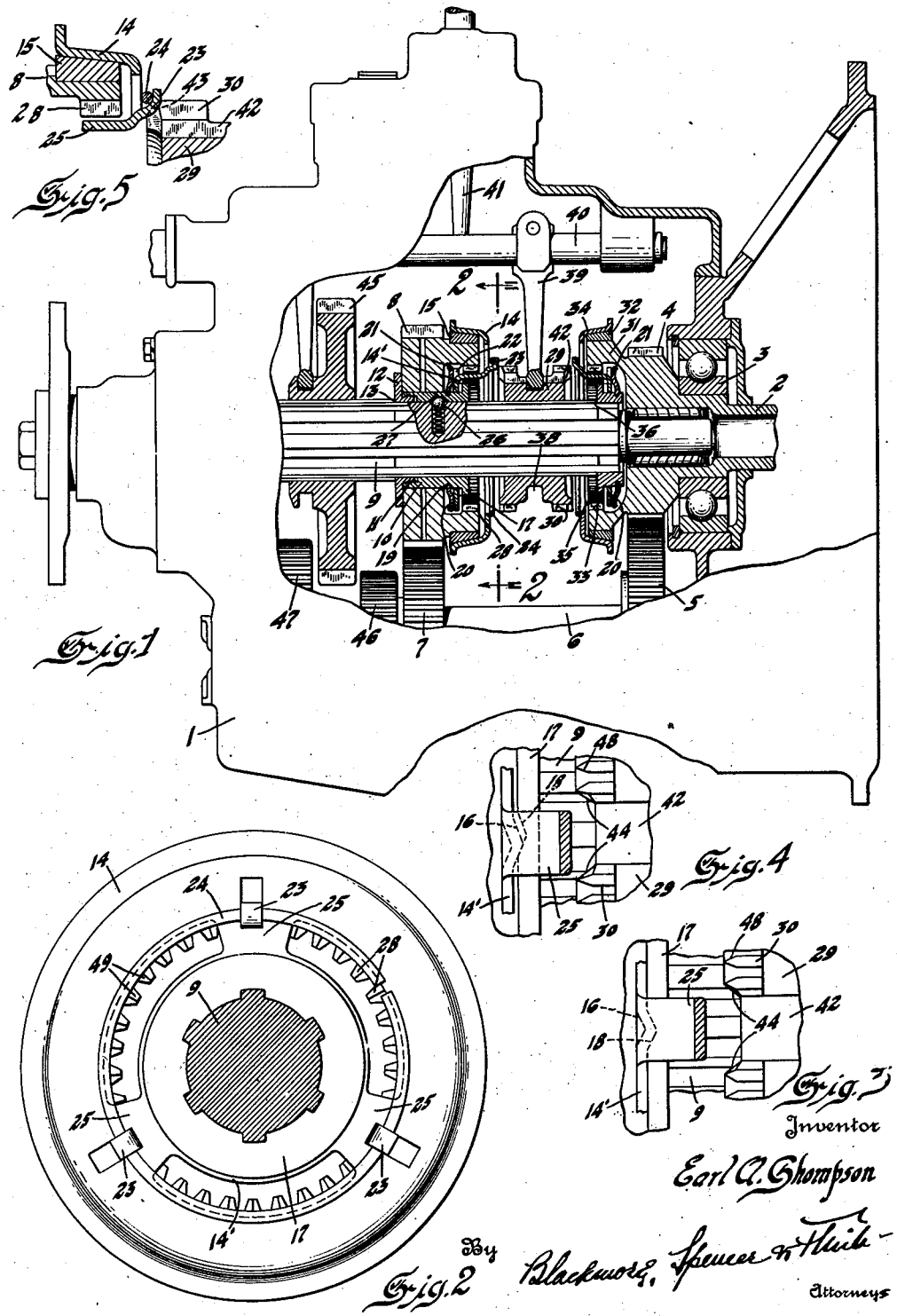

Patented Nov. 26, 1935

2,022,096

UNITED STATES PATENT OFFICE 2,022,096

SYNCHRONIZED POWER TRANSMISSION MECHANISM

Earl A. Thompson, Birmingham, Mich., assignor to General Motors Corporation, Detroit, Mich., a corporation of Delaware Original application August 27, 1928, Serial No. 302,228. Divided and this application June 20, 1930, Serial No. 462,511

19 Claims. (Cl. 192—53)

This application is a division of application Serial No. 302,228, filed by me on August 27, 1928, and the invention herein claimed relates to change speed transmission mechanism comprising two or more coaxial or alined power transmission members respectively provided with toothed couplings adapted to be intermeshed, whereby one member may be positively driven from the other, and also provided, respectively, with frictionally engageable elements adapted to be coupled in order to bring the power transmitting elements to substantially equal speeds prior to intermeshing the positive couplings.

The chief object of the invention claimed herein is to oppose intermeshing of the toothed coupling elements while the power transmitting members are rotating asynchronously by interposing a portion of one of the friction elements in the path of movement of one of the toothed coupling elements toward intermeshing position in response to a tangential force created by the differential rotation of the power transmitting members, which tangential force disappears as soon as the members attain synchronous speeds and no longer opposes intermeshing.

Additional objects and advantages of my invention will appear in the further description and illustration of one particular embodiment thereof, which I have shown on the accompanying drawing and now describe.

Figure 1 is a longitudinal vertical section through the transmission, with parts shown in elevation.

Figure 2 is a transverse vertical section taken on the line 2—2 of Figure 1, showing one of the synchronizing clutch members in elevation. This view is slightly enlarged in order to more clearly show the parts.

Figure 3 is a fragmentary plan view of the coupling member and portions of the synchronizing drum showing the rotatable cam elements in their normal position, one spoke of the synchronizing drum being shown in section.

Figure 4 is a fragmentary plan view similar to Figure 3, showing the relatively movable cam elements moved out of their normal position as they would be when the synchronizing clutch is engaged.

Figure 5 is an enlarged fragmentary section through the synchronizing drum and coupling showing the relative position of the parts when in neutral position.

Referring in detail to the drawing, my invention comprises the transmission casing 1 in which is mounted the shaft 2. This shaft transmits the drive from the motor in the usual manner through a friction clutch, not shown. The shaft 2 is supported by the bearing 3 and has formed on its inner end the gear 4, and in continuous driving engagement with the gear 4 is the gear 5 on the countershaft 6, which carries the gear 7, and in continuous driving relation with the gear 7 is the gear 8, the gear 8 being supported by the main splined drive shaft 9, which is supported on bearings in the transmission in a conventional manner. The gear 8 is mounted on a bushing 10, on which it is normally free to revolve. The rear end of this bushing 10 is interiorly threaded as at 11, and screwed into this threaded portion is the flanged nut 12. Both the bushing 10 and the nut 12 are splined to fit the splined shaft 9. A shoulder 13 is formed on the splined shaft 9 to limit the rearward travel of the nut 12 and bushing 10. The drum 14, which in this showing is designed to be formed of pressed steel, has its outer periphery made in a conical form and constitutes one of the female synchronizing friction elements. The other co-acting or male friction element is shown as the conical bushing or sleeve 15, which is secured to the hub or forward projecting ring-like part of the gear 8 in any suitable manner to revolve therewith. Internal teeth 28 are formed in said hub of the gear 8 for a purpose which will be later described. The hub 14', of the drum 14, fits over the bushing 10, said hub being formed as shown in Figures 3 and 4, with preferably two or more cam elements as at 16. Formed on the flange 17 of the bushing 10 are co-acting cam elements as at 18, which mate with the cam elements formed on the hub 14' of the drum 14. The hub 14' is composed of a central ring-like portion on which the cam elements 16 are formed and spokes 25 connecting the ring-like portion with the outer zone.

Fitting into an annular groove 19 formed in the bushing 10 is a split spring snap ring 20, having a plurality of ears or spring portions 21, which normally press against corresponding ears 22 formed up flush with the hub 14' of the drum 14. It will be evident from the height of these ears that they must be narrow enough to pass in between the internal teeth 28 to allow assembly of the gear and drum. The purpose of this spring will be later brought out. The drum 14 has formed in its outer face ears 23 forming a channel, as shown in Figures 1, 2 and 5, adapted to receive and support a snap ring 24, for a purpose which will later be explained. The drum 14 is also formed with spokes 25 which connect its outer periphery with the hub portion 14'. The purpose of this spoke construction will be later brought out. For yieldingly securing the bushing 10 in position a spring pressed ball as at 26 is carried in a hole drilled into the spline shaft 9 and engages into an indentation or recess 27 formed interiorly of the bushing 10.

A hub portion or ring-like part 31 is formed on the gear 4 and has secured thereto, to turn therewith, a conical bushing or sleeve 32 similar to the conical bushing 15 mounted on the gear 8 and constituting the other male synchronizing element. The hub 31 has internal teeth 33 formed therein. A friction drum 34, having a female conical surface to co-act with the bushing 32, is mounted on a bushing 35, which is splined to fit on the spline shaft 9 to turn therewith. The spline shaft 9 has a shoulder as at 36 to limit the rearward movement of the bushing 35.

Inasmuch as the drum 34 is identical with the drum 14 a detailed description thereof is deemed unnecessary. It is thought sufficient to say that the bushing 35 has cam elements formed therein identical with the cam elements 18 described in connection with bushing 10, which cam elements co-act with corresponding cam elements 16 on the drum 34. A spring snap ring 20 is carried in an annular groove formed in the bushing 35 for the purpose of pressing the drum 34 as described in connection with the drum 14. The use of different reference numerals on these identical drums is employed to facilitate the description of operation which will follow later.

A coupling element 29 is splined and mounted on the spline shaft 9 for sliding movement and has formed on its outer periphery at each end teeth 30 adapted to engage therewith the internal teeth 28 of the hub of gear 8, or the internal teeth 33 of the hub of gear 4. An annular groove 38 is formed in the coupling element 29 in which is received the shifter fork 39 for the purpose of shifting the coupling element longitudinally on the spline shaft 9. The shifter fork 39 is secured to the shifter rod 40, which is adapted to be shifted longitudinally by means of the control lever 41 in a conventional manner. The coupling element 29 also has longitudinally extending recesses formed in its outer periphery as at 42, separating the teeth into a plurality of angularly spaced groups, these recesses being equal in number to the spokes 25 formed in the drums 14 and 34. These recesses are slighty wider than the width of the spokes 25 of the drums and provide clearance for the spokes of the drums when the coupling element is shifted so that its external teeth 30 mesh with the internal teeth 28 or 33. The ends of the teeth 30 of the coupling element 29 are beveled in radial planes as at 43, Figure 5, so that when the coupling element is shifted these beveled ends of the teeth will engage the snap ring 24, carried by one or the other of the drums 14 or 34 for the purpose of moving the drum longitudinally to engage the conical friction surfaces. The drums 14 and 34 are disposed as shown to constitute intermediate synchronizing elements between the coupling element 29 and the ring-like internally toothed projections from gears 4 and 8. Said drums 14 and 34, each of which constitutes one element of a synchronizing pair, may be referred to as synchronizing drums or merely synchronizers.

The snap ring 24 is made of such proportions that it will exert a substantial pressure against the drum when coupling element 29 is moved toward teeth 28 or 33 before it will be expanded by the pressure of the beveled ends of the teeth 30 and allow the coupling element 29 to shift into engagement with the internal teeth 28 or 33. The ends of the teeth 30 and the sides of the recesses 42 of the coupling element 29 are beveled as at 44, shown in Figures 3 and 4.

Referring to Figure 3 it will be clearly seen that when the drum is in its normal position with its cam elements 16 fitting into the cam elements 18, formed in either of the bushings 10 or 35, that the spoke portions 25 of the drum will be in substantial alinement with the recesses 42 of the coupling element 29.

Referring now to Figure 4, which shows the drum out of its normal position, that is, when the cam elements 16 and 18 are rotated relatively to each other, it will be clearly seen that when the coupling element 29 is shifted that the inclined or chamfered sides 44 of the recesses 42 and adjacent teeth will engage one side or the other of the spoke 25, depending upon which sense of direction the drum cam elements are moved out of their normal position, and this engagement, as the coupling element 29 is shifted, will rotate the drum back to its normal position when synchronous rotation has been attained so that the spring ring 20 can act on the drum to disengage it from the conical bushings 15 or 32. In the event that the conical friction surfaces of the drum should tend to stick on the conical bushing and not freely release, the teeth 30 of the coupling element 29 striking the internal teeth 28 or 33 as it is shifted into engagement will jar the gears sufficiently in the direction necessary for disengagement of the conical friction surfaces to produce their disengagement, and thus allow the gears and toothed clutch elements to become free from the friction drums at the instant of engaging contact so that they may rotate sufficiently to permit easy intermeshing. While the power transmitting members to be coupled are rotating at different speeds the coupling element 29 cannot be forced into mesh with the companion toothed coupling element without the exercise of a force greater than the tangential force due to the difference in rotary speeds of the power transmitting members because the corners of the spokes of the friction drum are in the path of movement of the inclines 44 on coupling element 29. When the tangential force disappears with the achievement of synchronous rotation of the two power transmitting members the coupling element can be readily pushed by the operation of the shift lever into mesh with its companion as the friction drum, or the friction drum and the then idle gears to which it is frictionally coupled may be readily rotated by the tangential component of the force exerted by the inclined surfaces 44 against the rounded corners of the spokes 25 when coupling element 29 is moved axially, so as to aline the spokes with the recesses 42 and permit intermeshing of the positive coupling elements.

When the coupling element 29 is shifted to the right, Figure 1, so that its teeth 30 intermesh with the internal teeth 33, the shaft 2 is coupled to the spline shaft 9 for direct drive, and when the coupling element 29 is shifted to the left of Figure 1 so that its teeth 30 intermesh with the internal teeth 28 of the gear 8, the drive is through what is commonly known as "intermediate". The "low" and reverse drives are obtained by shifting the gear 45 into mesh with the gear 46 to obtain what is commonly known as "low gear" and the gear 45 when shifted in the opposite direction into mesh with the gear 47 obtains reversal of the drive. Inasmuch as these last mentioned parts are of conventional construction it is deemed unnecessary to describe them in detail, as they form no part of this invention and are merely shown to illustrate the complete set of gearing.

It will be understood from the foregoing description and having reference to Figures 1, 3 and 4 of the drawing that the drum 14 is caused to rotate by the bushing 10 through the cam elements 16 and 18, which constitute lost motion driving connections, the engaging of the conical surfaces of the drum with the conical bushing 15 preventing the cam elements 16, carried by the drum, from rotating out of engagement with the cam elements 18 carried by the bushing.

Another point I desire to emphasize, which I have found to be very important in the practical operation of this type of gearing, regardless of the specific form of synchronizing means used, is the manner of chamfering or pointing the ends of the teeth 30 of the coupling member 29 and the ends of the internal teeth 28 and 33, with which the teeth of the coupling elements intermesh. It will be seen by referring to Figures 2, 3 and 4 that the ends of the coupling teeth are beveled on their sides as at 48 to form a comparatively sharp point on the ends thereof, the ends of the internal teeth being similarly pointed as at 49 so that the coupling teeth 30 will find their way into easy engagement with the mating internal teeth 28 or 33. This construction is practical and desirable because the teeth are synchronized. In the old forms of gearing such design would not be good practice as the ends of the teeth would soon be worn away. Another important feature is that the teeth 30 of the coupling element 29 and cooperating internal teeth 28 and 33 are made of substantially finer pitch than teeth ordinarily used in the main gearing. For example, the teeth ordinarily used in the main gearing of automobile transmissions are usually made either six or seven diametrical pitch, or of some modified form of tooth corresponding to these pitches, whereas I have found that teeth for the coupling connection, corresponding substantially in size to twelve or fourteen diametrical pitch, give much superior results in obtaining smoother and easier engagement than when teeth of larger pitch are used.

The operation of the device is as follows: Suppose, for example, that the vehicle is moving and it is desired to shift into "intermediate" gear, the control lever 41 will be moved so that the coupling element 29 will be moved to the left in Figure 1. The first pressure applied to the coupling element for effecting this movement will cause the beveled ends 43 of the teeth 30 of the coupling element to bear against the snap ring 24 carried by the drum 14. This pressure will move the drum 14 into frictional engagement with the conical bushing 15 on the gear 8, which will then begin to develop a certain amount of torque, tending to bring the gear 8 to the speed of the spline shaft 9, which is being rotated by the movement of the vehicle. It will, however, be remembered that the drive for the drum 14 comes through the cam connection with the bushing 10, so that as the initial torque begins to build up on the friction surface of the drum the reaction between the cam surfaces 16 and 18 will force the drum tighter into engagement, which in turn will cause a greater torque reaction against the cam elements 16 and 18 and thus quickly build up the pressure of the drum 14 against the conical bushing 15 until the two parts are frictionally locked together, and thus the internal teeth 28 of the gear 8 are brought to the same rotative speed as the external teeth 30 of the coupling element 29. This synchronization will be brought about in a fraction of a second. As further pressure is applied from the control lever to shift the coupling member 29 the snap ring 24 will be expanded by the beveled ends 43 of the teeth of the coupling element, when the coupling element can then move further until the beveled sides 44 of the recesses 42 and adjacent teeth engage the rounded corners of the spokes 25 of the drum. As long as the two power transmitting members to be coupled are rotating asynchronously movement of the coupling member into mesh with its companion is opposed because the edges of the spokes are then in the line of axial movement of the beveled surfaces 44. In order that the toothed couplings may intermesh the coupling element 29 must push aside the friction clutch drum. It may do this easily when the two power transmission members to be coupled have attained equal speeds since then the tangential force which maintained the rounded corners of the arms 25 in the path of movement of the surfaces 44 of the coupling element 29 has disappeared.

In shifting from "intermediate" to direct drive or "high" the control lever is moved in the opposite direction which disengages the coupling element 29 from the gear 8 and through a similar set of operations as just described for "intermediate" gear the drum 34 will be caused to act through the cam elements 16 and 18 to frictionally engage the conical bushing 32 and thereby compel the shaft 2 to rotate in unison with the spline shaft 9 so that the teeth 30 of the coupling element 29 may be easily and smoothly meshed with the internal teeth 33, which are connected to the shaft 2, thus establishing a direct drive.

I claim:

1. The combination of two coaxial power transmitting members each having positive driving connection with one element of a toothed coupling and one element of a frictional coupling; one of said toothed coupling elements being axially movable and one of said frictional coupling elements having a rotary lost motion driving connection with and being capable of an axial movement relative to one of said power transmitting members sufficient to enable a frictional driving engagement with its companion to be made and broken; one of said toothed coupling elements having clutch teeth with beveled leading ends and said lost-motion connected frictional coupling element having cooperating surfaces disposed in position to contact with the beveled leading ends of said clutch teeth and oppose intermeshing movement of the toothed elements when said frictional element having said lost motion driving connection is at one limit of its path of rotary lost motion.

2. A combination as defined in claim 1 wherein the frictional coupling element having rotary lost motion driving connection with one of the power transmitting members is provided with openings for the passage of the clutch teeth of the axially movable toothed coupling element, the edges of the openings having contact elements adapted to engage the beveled leading ends on the adjacent clutch teeth of said axially movable toothed element.

3. A combination as defined in claim 1 wherein the frictional coupling element having a rotary lost motion driving connection with one of the power transmitting members is provided with passages separated by spokes, and one of the toothed coupling elements is provided with longitudinal recesses corresponding in position to the spokes of said lost motion connected friction coupling element, the edges of said spokes when said friction coupling element is at one end of its limited rotary movement being in position to oppose intermeshing of the toothed coupling elements by contacting with the beveled surfaces on the teeth adjacent the longitudinal recesses of said recessed toothed coupling element.

4. The combination of two coaxial power transmitting members one of which has an axial cavity and is provided with an annular row of internal coupling teeth and an external friction surface; a slidable coupling element on the other power transmitting member having an annular row of external teeth adapted to intermesh with said internal coupling teeth the external coupling teeth being arranged in a plurality of groups separated by recesses; an axially movable spoked friction coupling element provided with a dished central portion adapted to protrude into the cavity of the first named power transmission member and an internal friction surface adapted to engage with the external surface thereof; said dished portion of the axially movable friction coupling element having a rotary lost motion driving engagement with said other power transmission member, and its spokes corresponding in number and position with the recesses in the slidable toothed coupling element; the leading ends of the side walls of said recesses having beveled surfaces in position to engage the edges of the spokes when the friction coupling element of which they are a part is at one limit of its lost motion rotation.

5. A combination as defined in claim 4 in which the central portion of the friction coupling element having a lost motion connection with the member by which it is driven is of ring-like form provided with a lost motion driving connection.

6. The combination of two coaxial power transmitting members adapted to be driven one from the other; a positive coupling element in driving connection with each member, respectively, one of said coupling elements being movable into and out of driving engagement with the other; a friction clutch element in fixed driving connection with one member; a second friction clutch element in driving connection with the other member, said second friction clutch element mounted to have an axial and limited rotary movement with respect to the member with which it is in driving connection; said second friction clutch element being disposed between the positive coupling elements and having a passageway therethrough to permit the passage of the movable positive coupling element into engagement with its companion; detents on said second friction clutch element and on the movable positive coupling element disposed in alinement when the friction element is at one end of its limited rotary movement, an elastic ring mounted on one of said last named elements and adapted to frictionally engage the other during movement of the movable positive coupling element toward its companion.

7. The combination as defined in claim 6 in which the elastic ring is mounted on the second friction clutch element and is disposed so as to be deformed by the movable positive coupling element during movement thereof toward its companion.

8. The combination of two coaxial power transmitting members adapted to be driven one from the other; a positive coupling element in driving connection with each member, respectively, one of said coupling elements being movable into and out of driving engagement with the other; a friction clutch element in fixed driving connection with one member; a second friction clutch element in driving connection with the other member, said second friction clutch element mounted to have an axial and limited rotary movement with respect to the member with which it is in driving connection and being operatively disposed between the positive coupling elements and having an opening therethrough to permit passage of the movable positive coupling element into engagement with its companion; detents on said second frictional element and on the movable positive coupling element, respectively, disposed in alinement when the friction element is at one end of its limited relative rotary movement, and yieldable means mounted on one of the last named elements and adapted to frictionally engage the other during movement of the movable positive coupling element toward its companion.

9. The combination of two coaxial power transmitting members adapted to be positively coupled in driving relation; a friction and toothed positive coupling element fixed to one member; separate friction and positive elements in torque transmitting connection with an axially movable on the other member adapted to be engaged and disengaged with the companion elements on the first mentioned member; said slidably mounted friction element having openings therethrough, separated by spoke-like formations and said slidable positive element having groups of angularly spaced clutch teeth adapted to pass through said openings to engage the teeth of the companion element; and a deflectable elastic device arranged to produce frictional contact between said axially movable friction and positive elements during the movement of the positive element toward engagement with its companion so as to effect engagement of the friction elements prior to interlocking of the positive elements.

10. A combination as defined in claim 9 wherein the elastic friction device is disposed on said axially movable friction element in position to be engaged and deflected by the axially movable positive element during its movement toward interlocking engagement with its companion.

11. The combination defined in claim 9 wherein the elastic friction element consists of an elastic ring supported on the axially movable friction element and disposed in position to be engaged and deflected by the teeth of the axially movable positive element during their passage to and through said openings in the friction element toward engagement with the teeth of the companion positive element.

12. In a device of the class described, the combination of two members provided with coacting teeth adapted to be connected to drive one positively from the other, synchronizing means for causing the members to approach the same speed, said means including a synchronizer adapted to be shifted into frictional engagement with one of the members, and provided with an opening in alignment with said teeth, the other member provided with means for engaging the synchronizer to effect such frictional engagement, and said synchronizer provided with a deterrent spring normally projecting into said opening and disposed normally to one side of and in the path of movement of said other member and adapted to be engaged thereby and distorted thereby into position to provide a frictional engagement between the synchronizer and said other member.

13. In a device of the class described, the combination of a shaft, a power gear loose on the shaft and provided on one side with a ring-like extension having internal teeth on its inner periphery and a bevel face on its outer periphery constituting the male element of a conical friction clutch, synchronizing mechanism for causing the gear and shaft to approach the same speed, said mechanism including a friction clutch element surrounding the shaft, shiftable axially thereof, turning therewith and including a hub positioned between the shaft and the internal teeth, an outwardly extending part and a flange overlapping the male element, said flange having its inner face beveled and constituting the female element of the friction clutch, said outwardly extending part provided with an opening extending therethrough in registration with the internal teeth, a shift member splined to the shaft and having a peripheral groove, a shift finger engaging in said groove and acting to cause the synchronizing mechanism to function, said shift member provided on the side of the groove adjacent the axially shiftable friction clutch element with teeth adapted to pass through the opening in the axially shiftable friction clutch element and into mesh with the internal teeth to provide a positive drive between the power gear and the shaft, through said shift member.

14. In a device of the class described, the combination of a shaft, a gear loosely mounted for rotary movement on the shaft and provided on one side with clutch teeth spaced radially from the shaft, and a bevel face forming an element of a friction clutch of the cone type, a one piece slide member keyed directly to the shaft and provided with teeth adapted to engage the teeth on the gear to provide a positive clutch drive between the shaft and gear, and synchronizing means between the gear and slide member for causing the gear and shaft to approach the same speed, said synchronizing means including a synchronizer turning with the shaft and providing the coacting element of the friction clutch and said synchronizer provided with a ring-like part fitted between the shaft and said teeth and with an opening positioned externally of the ring-like part to permit the passage therethrough of the teeth on the slide member in their movement into and from their engagement with the clutch teeth on the gear and a single control element engaging said slide member to cause the same to slide to and from its positive clutch driving position and acting therethrough to cause the synchronizing means to function prior to the interengagement of the teeth.

15. The combination of two co-axial power transmitting members each having a positive driving connection with a toothed clutch element and a frictional clutch element, relatively disposed so that movement of the toothed clutch elements toward engaging position first effects engagement of the friction clutch elements; cooperating detent elements on one of said power transmission members and one of said friction elements which may be brought into axial alinement responsive to a differential rotation of said power transmitting members to prevent interengagement of the toothed clutch elements, but capable of being displaced angularly upon cessation of the force produced by the differential rotation of said power transmitting members, the zone of frictional engagement between the frictionally engageable members being farther from the center than the zones of engagement of the teeth of the toothed clutch members and the detents.

16. In transmission mechanism, a jaw clutch element and a friction clutch element rigid therewith; an axially slidable jaw clutch element; an axially movable friction clutch element; yielding means between the slidable jaw clutch element and the axially movable friction clutch element to insure engagement of the friction clutch elements during the initial movement of the slidable jaw clutch element toward the first mentioned jaw clutch element; and cooperating means on the slidable jaw clutch element and axially movable friction clutch element adapted to be set by the initial engagement of the friction clutch elements in position to oppose further axial movement of said axially movable jaw clutch element until synchronization has been effected.

17. The combination of two power transmitting members each including one element of a positively driven toothed clutch, adapted to establish a positive driving coupling between said members, and one element of a positively driven friction clutch adapted to establish a frictional driving coupling between said members, prior to intermeshing of the toothed elements; the teeth of said toothed clutch elements having inclined surfaces on the sides of their leading ends; one of said friction clutch elements having a limited rotary movement and an axial movement with respect to the member by which it is positively driven, and said last named friction clutch element having passages therethrough provided with detent surfaces on the side walls thereof adapted to engage the inclined surfaces on the leading ends of certain teeth of the positive clutch element that is driven by the same member in order to oppose intermeshing of the teeth of the toothed clutch elements during asynchronous rotation of said members.

18. In a device of the class described, the combination of a shaft, a power member on the shaft and mounted for rotary movement about its axis, said power member provided with a ring-like extension, the outer periphery of which extension forms the male element of a cone type friction clutch, and the inner periphery of which is provided with internal gear-like clutch teeth, a synchronizing mechanism, for causing the shaft and the power member to approach the same speed, said mechanism including an axially movable friction clutch element surrounding the shaft, turning therewith and including a female element adapted to coact with the male element to form a friction clutch of the cone type, said axially movable friction clutch element being provided with an opening extending therethrough in substantial registration with the gear-like internal clutch teeth, and a slide member splined to the shaft provided centrally thereof with a shift finger receiving groove and on one side of said groove with external gear-like clutch teeth, said slide member adapted to be disposed in a neutral position with its external teeth spaced from and thus disconnected from the internal gear-like clutch teeth on the power member and from said axially movable friction clutch element, and said slide member adapted to be moved from said neutral position towards and into engagement with said axially movable friction clutch element and acting therethrough to cause an interengaging of the friction clutch elements and to cause the external teeth on the advancing end to pass through the opening in the adjacent axially movable friction clutch element and to engage the internal gear-like clutch teeth in the power member.

19. In a device of the class described, the combination of two rotative members adapted to be connected to drive one from the other, one of said members comprising a shaft and the other a power gear mounted for rotary movement about the axis of the shaft, said gear provided with internal gear-like teeth constituting an element of a positive clutch and provided with a bevel surface constituting an element of a friction cone clutch, synchronizing means for causing the two members to approach the same speed before they are disposed in their interdriving relation through said positive clutch, said means including a synchronizer carried by the shaft, provided with a bevel surface constituting the coacting element of the friction cone clutch and having an opening extending therethrough in registration with the internal gear-like clutch teeth, and a shift member splined to the shaft to turn therewith and shiftable longitudinally thereon to and from an operative engagement with the synchronizer, means operable as an incident of the shifting of the shift member towards the synchronizer to cause the friction clutch to frictionally connect the shaft and power gear, said shift member provided with teeth constituting the coacting element of the positive clutch, said teeth adapted successively to engage the synchronizer, to shift the same axially and then to pass through the opening in the synchronizer to engage the internal gear-like clutch teeth to interconnect the members following the functioning of said synchronizing means.

EARL A. THOMPSON.